Jan. 19, 1954    C. W. VOGT    2,666,229
METHOD AND APPARATUS FOR PRODUCING
ACCURATELY MEASURED PLASTIC MASSES
Filed Nov. 8, 1949    2 Sheets-Sheet 2
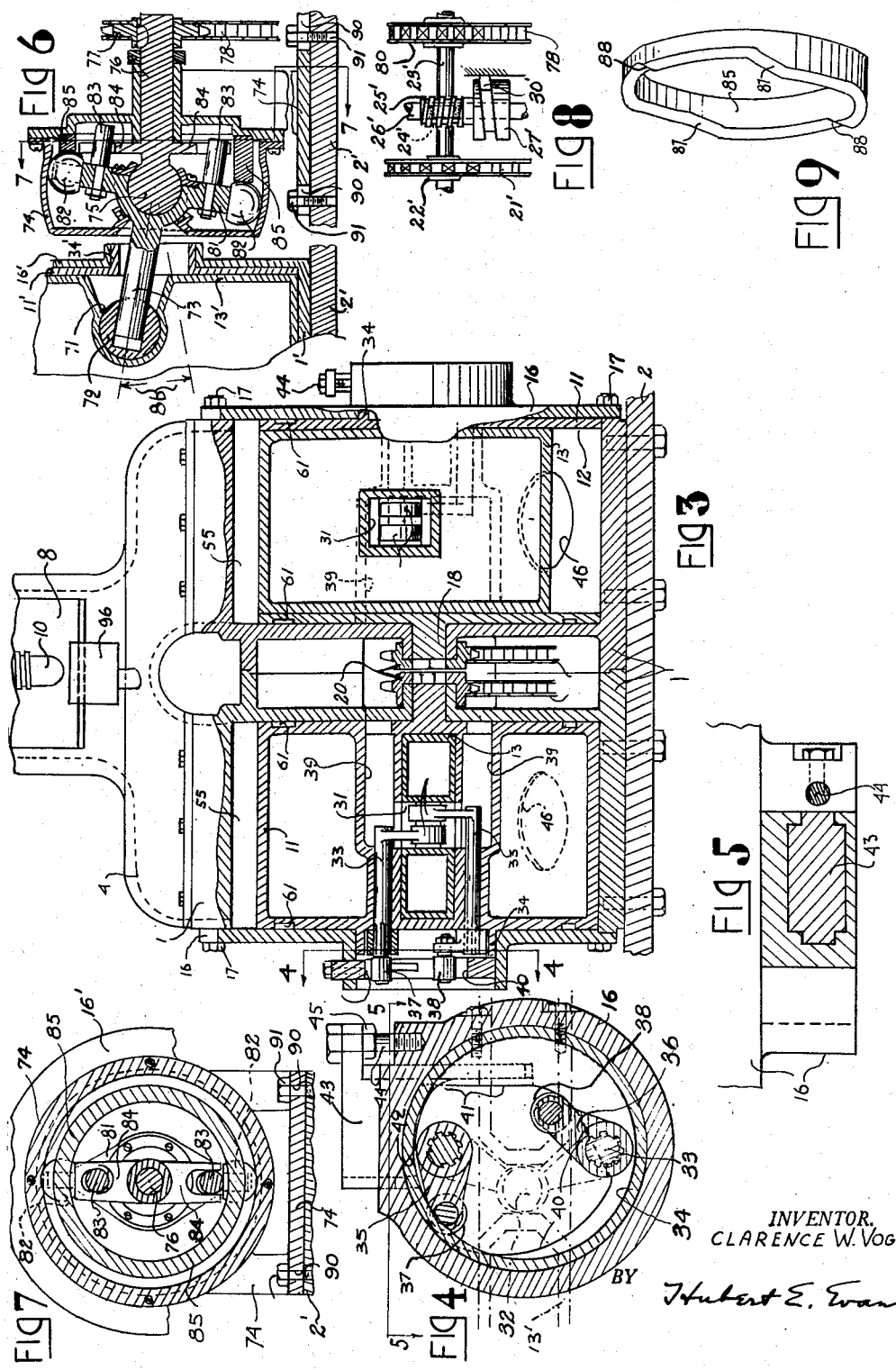
INVENTOR.
CLARENCE W. VOGT
BY Hubert E. Evans Patented Jan. 19, 1954

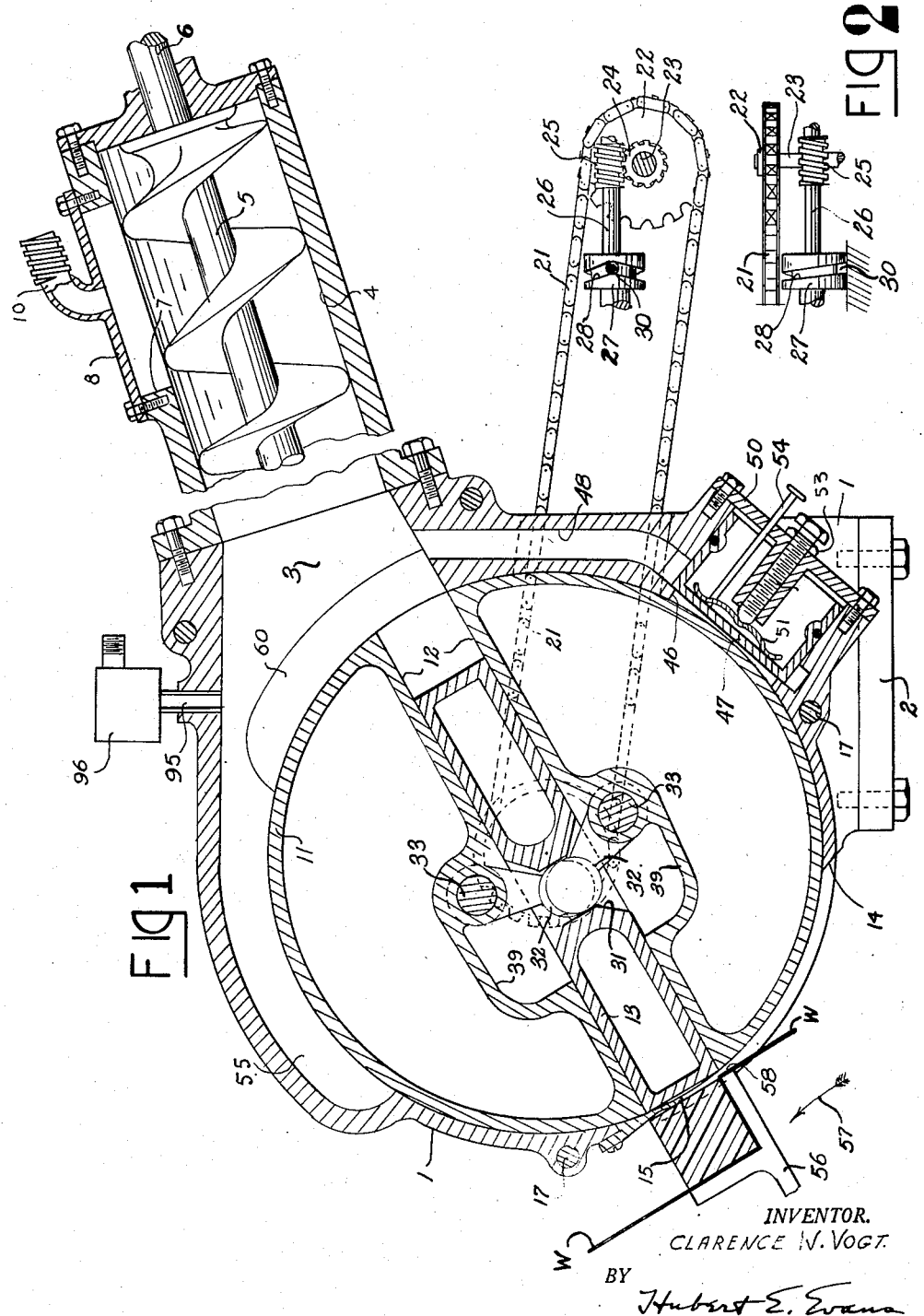

2,666,229

UNITED STATES PATENT OFFICE 2,666,229

METHOD AND APPARATUS FOR PRO-
DUCING ACCURATELY MEASURED
PLASTIC MASSES

Clarence W. Vogt, Norwalk, Conn.

Application November 8, 1949, Serial No. 126,213

17 Claims. (Cl. 18—21)

1

This invention relates to the production of measured masses of plastic material and in particular to a method of and apparatus for producing accurately measured masses of plastic material in condition for packaging.

This application is a continuation-in-part of my copending application Serial No. 123,575, filed October 26, 1949 and entitled Apparatus for and Method of Producing Plastic Masses.

It is an object of the present invention to produce measured individual masses of plastic material which will be more nearly uniform and accurate in their measurement than has hitherto been possible. With plastic materials such as butter and margarine, minimum weights are required to be maintained. The producer, however does not receive credit for the overage he must place in each package to avoid having any which are not up to the minimum. Accuracy of measurement of each mass to produce accuracy of weight is accordingly of major importance.

Another object is to provide a method of and apparatus for producing plastic masses, in which each mass may be measured by being forced to occupy a predetermined volume while the plastic is subjected to a constant and predetermined pressure.

A further object is to provide for the production of plastic masses in which the plastic may be continuously flowed from a source of supply, individual measured charges removed from the flow, and such charges rendered uniform and accurate and deposited alternately from separate discharge stations directly into suitable enwrapments.

Another object is to provide a method of and apparatus for producing plastic masses by feeding the plastic material and successively filling each of a plurality of measured cavities, and then compacting the plastic material in each of the measuring cavities by applying an increased pressure which may be uniform and of a predetermined amount while permitting the removal of any excess of plastic material over and above a predetermined volume. After exposure of the plastic to the increased predetermined pressure and removal of any excess, the measuring cavities may be sealed and advanced to a discharge station where the plastic material may be deposited for packaging.

A further object is to provide apparatus for and a method of producing plastic masses utilizing a plurality of measuring cavities, in which the cavities are disposed in a plurality of sequences alternately moved adjacent a source of

2 supply of plastic material in such timed relation that the flow of plastic to the cavities is substantially uniform and continuous.

A still further object is to provide a method of and apparatus for producing plastic masses accurately and speedily and in which only a few moving parts are in contact with the plastic material, with such parts being readily accessible for disassembly and cleaning purposes.

It is also an object to produce masses of plastic material with a unit which may operate to provide a closed system, an open system or a combination of these two by an easily made conversion.

Another object is to provide for the production of plastic masses by continuously flowing plastic from a source of supply and compressing the same to a predetermined volume while applying thereto a predetermined pressure without unduly working the plastic material or otherwise affecting its composition or physical characteristics.

Other objects and advantages will become apparent from the following detailed description accompanied by the drawings in which:

Figure 1 is a side elevational view in section of a preferred form of apparatus for carrying out the present invention;

Fig. 2 is a fragmentary plan view of a portion of the driving mechanism shown in Fig. 1;

Fig. 3 is another elevational view with parts broken away of the apparatus shown in Fig. 1 to illustrate features of the construction;

Fig. 4 is an enlarged sectional view taken substantially on line 4—4 of Fig. 3;

Fig. 5 is an enlarged sectional view taken substantially on line 5—5 of Fig. 4;

Fig. 6 is a fragmentary sectional view of a modified form of actuating mechanism for a portion of the apparatus;

Fig. 7 is a sectional view taken substantially on line 7—7 of Fig. 6;

Fig. 8 is a fragmentary plan view of a portion of the driving mechanism for the form of the invention shown in Figs. 6 and 7; and Fig. 9 is an enlarged perspective view of a portion of the apparatus shown in Figs. 6 and 7.

For the purpose of the present invention the term plastic material shall be construed to include a semi-plastic or plastic or partially set or solidified substance which under the conditions at the time it is being acted on may be formed or extruded by the use of relatively low pressures. Such materials may be flowed or forced through conduits or passages by the application of pressure. However, such materials will generally not flow under the influence of gravity to an appreciable extent. Examples of plastic materials which may be formed into measured masses in accordance with the present invention are butter, margarine, soap, lard and shortening as well as partially frozen materials such as ice cream, sherbets, etc.

I have found that the accuracy of measurement of individual plastic masses produced by a measuring and molding apparatus is materially affected by the fact that the means for feeding plastic to the apparatus does not operate to supply the plastic at a uniform pressure. For example, a rotary feeding screw will advance plastic with varying pressures, due to the irregular amount of slippage of the screw through the plastic. Since many plastics contain some entrained air or gas, which causes the plastic material to have a tendency to expand when pressure is released therefrom, the obtaining of accurate weights of plastic materials furnished at a variable pressure has been extremely difficult. Also, with some plastic materials a feed means, such as a screw, if used to feed plastics at too high a pressure will cause an overworking of the plastic. By way of illustration, margarine produced on a continuous process apparatus is improved in texture if it is slightly worked. This may be done by feeding margarine from the continuous process unit to a measuring and molding apparatus by a feed screw. However, if the feed screw is operated to deliver margarine at a pressure of more than about 15 pounds per square inch, the amount of working has an adverse effect on the quality of the product. While it would seem desirable to feed directly from the continuous process unit to a molding apparatus, this is also not practicable since the output pressure of the continuous process unit will have too wide a variance. It is extremely beneficial to advance plastic material with a substantially even and continuous flow. The intermittent application and release of pressure on the plastic material as it is flowed, not only tends to adversely affect its composition and physical characteristics but also detracts from the accuracy of measurement of the weight of the individual plastic masses.

The Miller Patents 2,329,287 and 2,329,288, granted September 14, 1943, disclose an attempt to obviate these troubles and force the plastic material into a measuring and molding cavity at a constant pressure. Apparatus constructed according to these principles, is not entirely satisfactory, and cannot be built to produce small masses, such as quarter-pound prints on a commercial basis. There is no even and continuous flow of the plastic material since the single molding cavity after being filled must be moved to a discharge station, the plastic expelled therefrom, and then returned to the filling station before additional plastic can be measured. This results in too slow operation, particularly for the smaller measured masses. Further, since the plastic is intermittently removed from the pressure chamber there will be pressure changes within such chamber and these are permitted by lost motion in the pressure correcting mechanism. During pressure changes arising in the continuous process unit, the pressure at which the masses are measured may vary considerably before they can be corrected.

I have discovered that a marked improvement can be obtained by measuring the plastic material in a predetermined volume while it has applied thereto a uniform predetermined pressure. Furthermore, this is accomplished by a construction which may not only have continuous operation but, what is more important, the plastic material may be flowed from the source of supply at a substantially constant and uniform rate. In principle, I accomplish this desired result by arranging a plurality of molding cavities or pockets in two or more sequences which move alternately adjacent the source of supply in such timed relation that at least one molding cavity is always receiving plastic material from the source of supply. The molding cavities are advanced to separate discharge stations and during passage between the source of supply and the discharge station, the plastic charge in each molding cavity may be compressed to a predetermined volume while a predetermined pressure is applied to the plastic material in the cavity. Provision is also made for removing any excess of plastic material over the desired predetermined volume from the molding cavity. While the predetermined pressure is applied to the plastic material in the cavity, it may be sealed from the source of supply and then moved to the discharge station where the mass may be deposited for packaging.

The drawings illustrate a preferred form of apparatus for carrying out the present invention and it will be seen that the measuring and forming mechanism may be enclosed within a suitable stationary housing 1 supported on a base plate 2 which may be carried or suspended at the desired height from the floor. The housing 1 is separable into two halves each of which contains a similar mechanism so that when one of these mechanisms is described it will be appreciated that the opposite one is identical. Each of the halves of the housing may be bolted or otherwise secured to the base 2 and an intake port 3 extends through the wall of the housing so that plastic material may be fed therethrough for measuring and molding. The plastic material may be supplied to the intake port 3 from any suitable source of supply of plastic material under pressure. Figs. 1 and 3 show as a feed means a conduit 4 in which a helical screw 5 is mounted for rotation. The conduit 4 terminates in a Y so that it may supply plastic material to the intake ports 3 of each half of the housing.

The screw 5 is carried by a shaft 6 which may be driven from any suitable source of rotary power (not shown). The walls of the conduit 4 may be provided with an opening 7 through which plastic material may be manually or otherwise placed for advancement to the housing 1. In Fig. 1 is may be seen that the opening 7 may be enclosed by a suitable cover member 8 having a connection 10 so that the unit may, if desired, be fed from the delivery pipe of a continuous process apparatus for manufacturing plastic material. For example, as will be later described, the discharge pipe of a continuously operating margarine producing unit may be connected to the connection 10. Alternately the cover plate 8 may be removed and a suitably shaped hopper substituted therefor to permit the feeding of chunks or pieces of plastic, such as butter, manually or by a suitable conveyor.

Disposed within each half of the housing 1 may be a rotary member 11 having a suitably shaped bore or aperture 12 therethrough to accommodate, for sliding movement, a piston member 13 shaped to fit adjacent the walls of the bore 12. In the drawings, the piston members 13 are shown as rectangular in cross-sectional outline and are dimensioned to correspond to the shape of the desired mass of plastic material to be produced. Such a shape may correspond, for example, to a quarter-pound print of butter or margarine. The withdrawing of the piston 13 into the bore 12 when an end of the piston is adjacent the intake port 3 will form a measuring pocket or cavity adapted to receive a charge of plastic material from the source of supply. With the piston members 13 being double acting and the bore 12 extending completely through the rotary member 11, a pair of measuring pockets, diametrically opposite to each other are provided. Obviously, each rotary member may if desired have a greater number of measuring cavities with individual pistons therefor arranged at spaced intervals around the periphery of the rotary member. Approximately opposite the intake ports 3 the housing may be provided with a pair of discharge stations or ports opening through the housing and defined by edge portions 14 and 15 disposed at the beginning and end respectively of the discharge ports or stations (see Fig. 1).

In operation, the piston is actuated during rotation of the rotary members 11 so that one end of the piston is withdrawn into the bore as it is in communication with the intake port to receive plastic material. This means that the opposite end of the piston is expelling, at the discharge station, a charge of plastic material which had previously been placed in the measuring cavity.

The ends of the housing 1 may be enclosed by suitably shaped lids or cover plates 16 which may be secured to the body of the housing such as by bolts 17. These lids assist in sealing the housing and the rotary members in operation, but may be readily removed to permit access to the pistons and rotary members so that they may be withdrawn for cleaning, maintenance and the like.

To support the rotary members during rotation, they may each be provided with a stub shaft extension 18 journaled in a portion of the housing. The stub shaft 18 may terminate in a square or hexagonal end adapted to be received in a complementary shaped opening of a sprocket member 20 which may also be mounted for rotation with respect to the housing. Entrained around the sprocket 20 may be a chain 21 by which the sprocket 18 and the rotary member 11 may be driven.

Preferably, the rotary members are driven with a continuous movement but the rate of movement during portions of the rotary cycle may be varied as desired. The lower right hand portions of Fig. 1 and Fig. 2 illustrate a preferred form of driving means for obtaining the desired rotary cycle of the rotary members. The chain 21 is entrained about and driven by a driving sprocket 22 mounted for rotation on a shaft 23. The shaft 23 also carries for rotation a worm wheel 24. Meshing with and driving the worm wheel 24 is a worm 25 which is mounted for sliding movement along a shaft 26 but is fixed for rotation with the shaft by a spline or elongated key. A cylindrical or barrel cam 27 may also be mounted for sliding movement with the worm 25 along the shaft 26 and is also secured for rotation with the worm 25 and shaft 26 by the spline or elongated key. Accordingly, both the worm 25 and the cam 27 may move axially along the shaft 26 during rotation thereof as dictated by the configuration of a cam track 28 in which is mounted a fixed roller follower 30 mounted adjacent the cam track 28. The shaft 26 may be driven by any source of suitable power (not shown) which may in addition be connected to drive a similar driving means for the other one of the rotary members 11 within the housing.

The purpose of this driving means is to provide a variable speed rotary cycle for each of the rotary members. For example, they may be caused to move relatively slowly through the filling and discharge zones, and to travel between zones at an appreciable accelerated speed. If during rotation of the worm 25, the cam track 28 angles at an angle approaching the leading angle of the worm, the axial movement of the cam and worm along the shaft 26 will prevent the worm from exerting its full driving effect on the worm wheel 24, and the shaft 23 will be driven more slowly. The extent of this decelerated movement of the shaft 23 is controlled by the peripheral extent of the desired curvature of the cam track 28. Since the cam track returns the cam and worm to their initial starting point during every revolution there will be an opposite or reverse angling of the cam track 28 causing an acceleration in the rotary speed of the worm wheel 24, the shaft 23 and accordingly of the rotary member 11. It may be seen that by varying the angularity and the peripheral extent of the curvature of the cam track 28 almost any desired condition can be obtained. The shaft 23 which drives the rotary member 11 may be caused to dwell or pause for as long as about three quarters of a revolution, or may be made to have other deceleration and acceleration characteristics. With the piston members 13 being double ended, the rotary members 11 may complete their operating cycle in one half a revolution. This means that the shaft 23 driving the rotary member may rotate at half the speed of the shaft 26. Thus for practical considerations of size, strength, etc., it is preferable to utilize a multiple thread worm and a suitable worm wheel so that a two to one reduction is effected. Four, six, or eight thread worms may be utilized with eight, twelve or sixteen tooth worm wheels with very satisfactory results.

As the rotary members revolve, carrying the ends of the pistons adjacent the intake port, the piston members are alternately caused to withdraw to receive a charge of plastic material from the source of supply and carry it to the discharge station where it may be expelled and deposited for packaging. Since the plastic material in the source of supply is under pressure, the withdrawing of the piston to form a measuring pocket or cavity facilitates the filling or placement of plastic material in the measuring pocket. With the piston members being double ended it may be seen that the means for withdrawing the piston at the intake port will cause the opposite end of the piston to expel a measured charge of plastic at the discharge port.

Any suitable means for causing a sliding movement of the piston with respect to the rotary members may be utilized, it being preferable that the actuating mechanism be operable during continuous movement of the rotary member and also that the amount of movement of the piston or stroke be adjustable to vary the size of the measuring cavity and accordingly the amount of the charge of plastic material.

Figs. 1, 3, 4 and 5 illustrate a satisfactory form of piston actuating mechanism. Each of the piston members is provided with a centrally disposed aperture 31 the walls of which fit closely adjacent a pair of cylindrical contact members 32. These contact members are carried on the ends of rods 33 journaled in passages through the rotary member to permit oscillating movement of the rods with respect to the rotary member. As may be seen in Fig. 1 the rods 33 are disposed on opposite sides of the bore 12 through the rotary member so that the contact members 32 carried by the rods extend into the aperture 31 from opposite sides of the piston. The rods 33 extend in a direction parallel to the axis of rotation of the rotary member into a recess defined by an integral collar 34 which extends outwardly from the side face of the rotary member and is journaled in a collar portion of the lid or cover plate 16 of the housing. The ends of the rods 33 are splined for connection with a pair of apertured arms 35 and 36, which arms also carry rollers 37 and 38 respectively. In the path of the rollers 37 and 38 the lid 16 is provided with a cam surface 40 adapted to contact the rollers and cause either or both of them to oscillate about the axis of their rods 33 thus pivoting either or both contact members 32 and causing a sliding movement of the piston.

To assemble the actuating mechanism, the rods 33 and contact members 32 may be inserted through slots or openings 39 in the rotary member with the rods 33 sliding through the passages in which they are journaled. Next the splined ends of the rods 33 may be held to retain the members 32 in the openings 39 and out of the bore 12 to permit insertion of the piston member 13. When the aperture 31 through the piston is opposite the members 32 they may be rotated so that they may be received in the aperture 31 as shown in Fig. 1. The arms 35 and 36 may be placed on the splined ends of the rods 33 and, preferably, the splined portions may be irregular so that the arms fit only in their properly adjusted position. The rotary member and piston may now be assembled into the housing ready to receive the cover plate 16.

To increase the accuracy of measurment of the plastic masses to be produced and to insure complete filling of the measuring cavities it is believed preferable that the cam surface 40 cause the piston member at the intake port to move sufficiently that an excess of plastic material will flow into the measuring cavity or pocket. Then, the piston may be actuated to move to a desired predetermined volume before expelling the plastic mass which will compress the charge of plastic material. Looking at Fig. 4 the cam surface 40 is provided with a portion indicated by the numeral 41 which causes the piston to withdraw and receive a charge of plastic material. In the position shown in Fig. 4 the roller 38 is just leaving the portion 41 which caused the piston to be withdrawn as it moved past the intake port and the position of the members 32 and piston 13 are shown in dot and dash lines. After the piston has moved past the intake port and the measuring cavity has been sealed, the roller 37 in Fig. 4 will contact an adjustable projection 42 of the cam surface 40, causing the piston to move in the opposite direction to decrease the measuring cavity to the desired predetermined volume.

To permit an adjustment of the projection 42 and thus control the final predetermined size of the measuring pocket, the projection 42 may be carried by a suitably shaped slide member 43, which is slidably mounted in a portion of the lid 16 (see Figs. 4 and 5). The position of the slide member 43 may be controlled by an adjusting screw 44 threadedly mounted in the lid 16 and securely held at desired positions by lock nut 45.

At the time that the piston member is moved to decrease the volume of the measuring pocket the rotary member has brought the measuring cavity of the piston opposite an opening 46 through the housing wall which opening is controlled by a valve 47 (see Fig. 1). The valve 47 controls the communication of the opening 46 with a passage 48 leading through the housing to the intake port 3. The valve 47 may comprise a hollow cup-shaped member, slidably mounted in an aperture through the housing which aperture may be covered by a cover 50 bolted or otherwise secured to the housing. The valve member 47 may be retained in its closed position by a spring having a suitable strength so that it will resist opening of the valve by the desired predetermined pressure. For example, a suitable spring 51 shown as a leaf spring, may be mounted in the interior of the valve member in position to bear against the valve member and an end portion of an adjusting stud 52, threadedly mounted through the cover 50. The spring tension may be adjusted by the stud 52 and the adjustment locked by lock nut 53.

This mechanism permits the escape of any excess of plastic material from the measuring pocket as it is being compressed by the piston member to the desired predetermined volume. The compression occurs while the plastic material has applied thereto a predetermined constant pressure due to the spring loading of the valve member 47. In effect this means that the measured charge of plastic material is compressed as it passes adjacent the opening 46 to a predetermined volume at a predetermined pressure with the excess material removed from the measuring pocket and allowed to flow through the passage 48 back to the intake port. After this compressing and measuring of the charge of plastic material, the measuring pocket is sealed by the movement of the rotary member past the opening 46 and the compressed or measured charge may then be expelled at the discharge opening.

The actuating of the piston member by the adjustable projection 42 of the cam surface 40 to compress the charge of plastic at one end of the piston will obviously cause the withdrawal of the opposite end of the piston where a single double acting piston is employed. For this reason the intake port is extended as indicated at 55 in Fig. 1 so that the measuring pocket at the end of the piston opposite the opening 46 and valve 47 is in communication with the source of supply of plastic material. This means that this latter measuring pocket will be partially filled due to the movement of the piston member to compress the charge in the measuring pocket of the opposite end of the double acting piston. The partially filled measuring pocket will be completely filled when the rotary member revolves to bring the compressed charge to the discharge station and the piston member moves to expel such charge.

Under normal operating conditions the plastic material will be delivered by the feed means to the measuring pocket at a pressure which may vary. An excess of plastic material over that desired for each mass will be placed in the measuring pocket. The compressing of the measuring pocket to a predetermined volume will cause the excess plastic material to move the valve member forcing the excess to return to the source of supply since the constant pressure at which the charge is to be measured will be higher than that at which the feed means can supply plastic material. Accordingly, as each measuring pocket passes the opening 46 the valve member 47 will be moved. As a check on this normal operation the valve member may carry an indicator element 54, which extends through the cover 50 and may be watched by an operator to note whether it is intermittently moving. Obviously, if desired, the indicator 54 may be connected with an electrical circuit so that if the desired movement does not occur, a conventional control mechanism to stop the machine or warn the operator may be actuated.

As the compressed and measured charge is sealed and moved to the discharge station the roller 37 in Fig. 4 will be adjacent the portion 41 and will actuate the piston to expel the measured charge, simultaneously causing a filling of the measuring pocket at the opposite end of the piston. This cycle of operation is repeated by each of the rotary members to provide alternate deposit of accurately measured masses at each of the separate discharge stations.

The provision for obtaining constant and uniform flow of the plastic material through the source of supply may be obtained by proper timing of the rotary members. Their operating cycles may be identical but out of phase with respect to each other, so that when the measuring pocket of one rotary member is receiving a charge, the measuring pocket of the other rotary member is moving between the intake and discharge stations. The curvatures of the cam tracks 28 of the cams 27 in the drive of the rotary members may be suitably configured so that a measuring pocket of one rotary member is finishing its accelerated motion and is beginning its decelerated motion, adjacent the start of the intake port, before the measuring pocket of the other rotary member has left the end of the intake port. The curvature of the portion 41 of the cam surface 40 also affects this timing operation. The sliding movement of the piston may be caused to occur during the desired arcuate movement of the rotary member whether it be at its accelerated or decelerated rate. In any event, the intake port should be suitably dimensioned and arranged so that the piston is not actuated for its stroke until at least half of the end face of the piston is exposed to the port. In the case of the discharge port, it must be dimensioned and located so that the end face of the piston is completely past the edge portion 14 of the housing before the piston is actuated and expelling must be completed before the mass reaches the edge portion 15 (see Fig. 1). Thus, the measuring pocket is completely exposed and the charge may be expelled without deformation.

If desired, the cam surface 40 may be constructed so that both of the rollers 37 and 38 are in contact therewith throughout most of their rotary cycle. It may be noted that except for the times that either one of the rollers is on the portions 41 and 42, the rollers move in arcuate paths about the axis of rotation of the rotary member. Since the portion 41 is fixed, the path of the opposite roller when one roller moves over the portion 41 is a fixed path. But this is not true of the movable portion 42, except when it is at its extreme radially inward adjustment. It is believed desirable to control the position of both of the rollers 37 and 38 throughout most or all of their movement. Obviously, this may be done by providing a closed cam track for the rollers to continuously control their positions and accordingly the position of the piston.

Adjacent the end of the discharge station, a means for severing or removing the mass of plastic material from the piston is provided. The edge portion 15 of the housing may be formed to provide a shearing edge causing a separation of the mass as the rotary member moves the mass past such edge. At this point the mass may be deposited onto any suitable conveying means so that it may be conveyed to suitable packaging apparatus. It is preferable that the masses be deposited directly onto enwrapments, particularly since most plastic materials have a tendency to adhere to contacting surfaces. Any transferring of the mass will cause losses in the amount of the mass which may affect its accuracy and cause it to be less than the desired measured amount. In Fig. 1 a support member 56 is indicated which carries a suitable section of sheet material or enwrapment W. Details for a mechanism for feeding enwrapments adjacent the discharge stations to receive the plastic masses is not considered an essential part of the present invention, and such mechanism is accordingly only schematically indicated. It is believed especially advantageous to feed the enwrapments in such a manner that after deposit of the mass a trailing edge or flap of the enwrapment may be caused to move adjacent and wipe any plastic material tending to adhere to the severing edge 15 of the housing. For example, in Fig. 1 the support member 56 may be one of a series of similar members moving in the path indicated by the arrow 57 which will cause a portion 58 of the trailing flap of the enwrapment to engage and wipe clean the severing edge 15.

As previously described, the mechanism for forming and measuring plastic masses is enclosed within the housing 1 to minimize the problem of leakage of plastic material from between surfaces having a relative movement. It may be desirable to provide for the flow of plastic material through the mechanism since many of the plastic materials for instance such as butter and margarine are excellent lubricants. To illustrate this feature, the portions of the housing in the region of the intake port may be relieved adjacent the side faces of the rotor as indicated by numeral 60 in Fig. 1 so that the plastic may flow around the sides of the rotor. Similarly the rotary members may be relieved as indicated by the numeral 61 in Fig. 3 to provide for the flow of the plastic during rotation of the rotary members. It is even contemplated that it may be desirable to provide suitable passages so that plastic may flow into the actuating mechanisms for the pistons and then out through the cover plates 16 of the housing. In this way the plastic material used as a lubricant may be disposed of so that it will not contaminate the masses of plastic produced by the apparatus.

In the modified form of the invention shown in Figs. 6 through 9 a slightly different mechanism for actuating the piston members is disclosed. A major portion of the actuating mechanism may be disposed on the exterior of the stationary housing so that the number of parts within the housing is materially reduced. The purpose of this form of the invention is to reduce the number of moving parts and the amount of frictional engagement of moving parts within the housing. If the plastic material has any tendency to deleteriously affect the working parts of the apparatus or if the plastic material may be adversely affected by frictional engagement, such form of mechanism might be essential for commercial operation.

Fig. 6 shows a portion of a stationary housing 1' suitably supported on a base-plate 2'. As in the previously described form of the invention a pair of rotary members, one of which is indicated by the numeral 11', are mounted for rotation within the housing. Each of the rotary members is provided with an aperture or bore in which a piston member 13' may be mounted for sliding movement. Fig. 8 shows a portion of the drive for one of the rotary members. The rotary members may be mounted to be driven by a sprocket (not shown) driven by a chain 21' carried by a sprocket 22' mounted for rotation on a shaft 23'. The shaft 23' carries a worm wheel 24' which meshes with a worm 25' mounted on a driving shaft 26'. Adjacent the worm is a cam 27' and the worm and cam are mounted so that they are axially movable along the driving shaft 26' but secured for rotation with the shaft. The axial movement of the cam and worm are created by the fixed roller 30' so that the desired rotary cycle of the rotary member is obtained, as described in connection with the form of invention shown in Figs. 1 through 5.

Each of the piston members 13' may be provided with a recess or pocket 71 to receive a rounded member 72, which is apertured to carry stem 73 of an actuating member (see Fig. 6). The stem 73 may extend outwardly to the exterior of the housing by being disposed within a collar 34' of the rotary member which extends through and is journaled in a collar portion of the lid 16' of the housing. Disposed exteriorly of the housing 1' are the balance of the parts for actuating the piston, enclosed within a suitable casing 74 mounted on the base plate 2'. Within this casing, which may be sealed and thus contain a suitable lubricant for the moving parts therein, the stem 73 of the actuating member terminates in a spherical socket adapted to receive a spherical projection or ball 75 carried at the end of a driving shaft 76. The shaft 76 is journaled for rotation in a portion of the casing 74 and may be driven by a sprocket 77 mounted for rotation thereon. The sprocket 77 is engaged and driven by a chain 78 which is also entrained around a sprocket 89 carried by the shaft 23'. As shown in Fig. 8 the shaft 23' is powered to drive the rotary member 11' in its variable speed rotary cycle. Adjacent the socket of the actuating member which receives the ball 75 are a pair of arms 81 which carry at their extremities spherical roller followers 82. These arms 81 also carry pins 83 which are received for driving engagement in the slots of yoke members 84 carried by the driving shaft 76.

It may thus be seen that the rotary member 11' and the shaft 76 are driven in the same timed relationship, with the shaft 76 driving (through the yoke members 84) the arms 81 and the stem 73 of the actuating member. During rotation of the arms 81, the roller followers 82, carried by the arms, run over the surface of a stationary annular cam member 85 secured to or formed in the casing 74. This cam member is shown in perspective in Fig. 9. The curvature and slope of the cam surface will cause the rollers 82 and the actuating member to oscillate about the center of the ball 75 causing the stem 73 to move through the angle indicated by the arrows 86 in Fig. 6. Such a movement of the stem 73 may cause sliding movement of the piston member at the desired times during its rotary movement with the rotor.

For example, the sloping portions of the cam indicated by the numeral 87 in Fig. 9 will cause the piston member to slide in the rotary member when one end of the piston is adjacent the source of supply and the other end of the piston is at the discharge station. This causes a measuring cavity to fill with plastic material from the source of supply and will simultaneously cause expulsion of a measured amount of plastic material at the discharge station. At the desired appropriate time, that is, when the filled measuring cavity is opposite the opening 46 and the loaded valve 47, the smaller slope or change in elevation, indicated by the numeral 88 in Fig. 9, will cause the piston to compress the charge in the measuring picket to a predetermined volume against the spring pressure holding the valve in a closed position. This provides the desired action of measuring a predetermined volume of plastic material while applying a predetermined pressure thereto.

To provide adjustment in the length of the stroke of the piston and accordingly in the measured amount of each mass of plastic material it is only necessary to vary the effective length of the stem 73 from the center of the ball 75 to the center of the member 72 (Fig. 6). This may be done by bodily moving the casing 74 with respect to the housing 1' and the base plate 2'. Diagramatically, this adjustment is illustrated in Fig. 6. The base of the casing member 74 is provided with slots 90 through which bolts 91 for securing the casing to the base plate 2' may pass. The adjustment is accomplished by loosening such bolts and sliding the casing with respect to the housing to increase or decrease the effective length of the stem 73.

It will be noted from Fig. 6 that a considerable adjustment can be obtained without withdrawing the stem 73 from the member 72. Lengthening the radius of oscillation of the stem 73, means that for the same angular amount of oscillation, the stroke of the piston will be greater. Since the changes in the elevation of the cam 85 will still produce the same angular amount of oscillation of the actuator member, a longer oscillating radius will mean that the measuring pocket will receive a larger amount of plastic material at the intake port but the compressing stroke of the piston will also be proportionately increased and will result in obtaining the desired adjusted increase in the predetermined volume of the measuring pocket.

In this modified form of the invention, the stem 73 is rotated with the shaft 76 and in timed relation with the rotary member. Thus, the only frictional engagement due to the actuating mechanism is the rolling or rocking action of the member 72 with respect to the recess 71 in the piston. The balance of the moving parts and frictional engagement due to such movement occurs outside of the housing and within the casing 74. Also, it may be noted that for disassembly, the stem 73 and the member 72 may be slid from the recess 71 in the piston and removed through the collar 34' of the rotary member. Then, for cleaning purposes, it is only necessary to remove the lid 16', the rotary member 11' and the piston member 13' from the housing.

As previously stated, the feed means for supplying plastic material to be measured and deposited for packaging, may be a conveyor such as the helical screw 5, or may comprise a direct connection with a continuous-process apparatus. In the event that the mechanism is to be operated in conjunction with the continuous process apparatus, it may be desirable to provide for working of the plastic material prior to forming it into individual masses. This may be accomplished by connecting the continuous process apparatus to the connection 10 on the cover 8 of the conduit 4 and flowing plastic material into the conduit. Then if the direction of rotation of the helical screw is reversed from its normal direction of operation, the screw will tend to resist the flow of plastic material to the intake port and work the plastic material as it is flowed through the conduit 4. Further, such continuous process unit will normally deliver the plastic material at a pressure which is higher than may be desired, the feeding of the plastic material in opposition to the rotation of the screw will serve to dissipate and reduce the pressure on the plastic material. When it is desired to cease operation, the delivery of the plastic material from the continuous process apparatus may be stopped and the direction of rotation of the screw reversed to feed the balance of the material in the conduit 4 to the intake port. During this feeding of plastic material by the screw means, the cover 8 may be removed to permit feeding of masses of plastic material which were found to be undesirable, from the standpoint of the weight or appearance, or were deformed during packaging operations.

To prevent the feed means from operating to supply plastic material at a pressure higher than is desired, an opening 95 may be provided to permit the connection of a suitable pressure indicator or regulator 96 (see Fig. 1).

As a control measure, the indicator or regulator 96 may be connected to vary the driving speed of the rotary members and thus increase or decrease the speed of production of plastic masses or may operate to vary the speed of the feed means. Alternatively, the control mechanism may open a bypass for the plastic material or may sound a warning or stop the apparatus to permit correction of the condition. By way of illustration, the plastic material may be advanced by a feed means to the intake port of the housing at a pressure of approximately 15 pounds per square inch and the spring 51 of the pre-loaded valve 47 may be adjusted to provide a pressure of about 30 pounds per square inch resisting the compression of the plastic material to the desired predetermined volume. The measurement of the plastic at a predetermined volume and while a uniform and predetermined pressure is applied thereto will provide uniformly accurate weighed masses. Further, any variation in the amount of entrained gas or air in the plastic will be minimized since the application of the higher and constant pressure will compress such gas or air so that it becomes a smaller proportion of the charge. Thus, the unit masses produced will have a more nearly uniform density.

As has been described, the filling and expulsion of plastic into and out of the measuring and molding cavities may be done during movement of the rotary members. Due to the wide range of permissable variation in the rotary cycle of the rotary members afforded by the drive mechanism, it will be seen that the rotary members may be decelerated so that filling and expelling will occur during relatively short and slow arcuate movement of the rotary members. Similarly the drive of the rotary members may cause them to move at decelerated speed during the compressing of the charge of plastic material during travel from the intake to the discharge stations. At the same time, however, the rotary members may be driven so that at least one measuring pocket is receiving plastic at all times to permit continuous and substantially uniform flow of plastic material from the source of supply, with alternate deposit of accurately measured and formed plastic masses for packaging.

The drawings show the masses produced as being square or rectangular in cross section, with a shorter dimension of the mass disposed along the periphery of the rotary member. In this construction the measuring pocket serves to shape or mold the mass as it is being measured. The configuration of the mass may substantially differ. The measuring pockets may be round and expel through a forming aperture or nozzle, as shown in my previously identified copending application, Serial No. 123,575. The forming aperture or nozzle may have any desired configuration such as round, triangular, hexagonal or some irregular shape.

While two mechanisms have been disclosed for actuating the sliding movement of the pistons, many other satisfactory ways of obtaining the desired movement are possible. The piston may, for example, have integrally formed rack teeth meshing with a pinion carried on a shaft passing through and aligned with the axis of rotation of the rotary members. The control and adjustment of the piston stroke may then be obtained by driving means associated with the pinion shaft and obtaining power from a suitable source, such as the shaft carrying the worm and cam which shaft is moving at a constant speed. The pistons of each rotary member may be individual rather than double ended and may be separately actuated and controlled. This may be advantageous to obviate the withdrawing of an end of the piston in the region of the extended intake port 55 when the opposite piston end is being actuated to compress the charge of plastic material.

There are several ways of obtaining an adjustment of the measured amount of the masses produced by the present invention. In the form of the invention shown in Figs. 1 through 5 the cam mechanism causes the piston to take in a fixed measured charge and the adjustment is obtained by varying the amount of piston stroke of the compression to a predetermined volume. However, in the form of the invention shown in Figs. 6 through 9 the adjustment changes the amount of the initial charge and the amount of piston stroke to compress the charge to a predetermined volume. Both of these methods result in an adjustment of the final predetermined volume so that accurate measured amounts of the resultant plastic masses may be obtained even though the properties such as density of the plastic supplied to the unit may vary from time to time.

It will be appreciated that in the drawings, proportions have been exaggerated in some instances to provide a greater understanding of the invention.

It will be understood that the foregoing description of preferred embodiments of the invention is for the purpose of explanation and illustration and numerous variations and modifications other than those which have been described may be made without departing from the spirit of the invention.

What I claim is:

1. The method of producing masses of plastic material which comprises measuring a mass of plastic material, compressing said mass to a predetermined volume of said material at a predetermined pressure, separating any excess of said material over said predetermined volume at said predetermined pressure, and depositing said predetermined volume for packaging.

2. The method of producing measured masses of plastic material which comprises successively filling each of a plurality of measuring pockets with plastic material continuously flowing from a source of supply, isolating the material within the pockets from the source of supply, successively compressing the plastic material in each of said measuring pockets until each pocket holds a predetermined volume of plastic material at a predetermined pressure, removing any excess of plastic material over said predetermined volume at said predetermined pressure, and depositing said measured masses of plastic material for packaging.

3. The method of producing measured masses of plastic material which comprises overfilling a measuring pocket with plastic material from a source of supply under pressure, forcing all but a predetermined volume of plastic material from said pocket while applying a predetermined pressure to the plastic material in said pocket, sealing said pocket against appreciable leakage while maintaining said predetermined volume, and depositing said predetermined volume of plastic material as an individual mass for packaging.

4. The method of producing measured masses of plastic material which comprises filling a measuring cavity with plastic material under pressure, compressing the plastic material in said molding cavity to a predetermined volume while applying an increased predetermined pressure to the plastic material in said cavity, separating any excess of said material from said predetermined volume of said predetermined pressure, sealing said cavity, advancing the same to discharge position, and expelling said predetermined volume of plastic material as an individual mass for packaging.

5. The method of producing measured masses of plastic material which comprises successively filling each of a plurality of measuring pockets arranged in at least two sequences with plastic material under pressure, isolating the material within the pockets from the source of supply, successively compressing the plastic material in each of said pockets to a predetermined volume while applying a predetermined increased pressure, successively separating any excess of said material from said predetermined volume at said predetermined pressure, successively sealing said pockets, and successively depositing said predetermined volume from said pockets as individual plastic masses.

6. The method of producing measured masses of plastic material which comprises feeding plastic material under pressure to an enclosure, filling a measuring pocket in communication with said enclosure with plastic material, moving said measuring pocket out of communication with said enclosure, expelling excess plastic from said pocket against a predetermined pressure, sealing said pocket, moving said pocket to a discharge station, and depositing the resulting mass of plastic for packaging.

7. In apparatus for producing accurately measured masses of plastic material, means for filling each of a plurality of measuring pockets with plastic material from a source of supply under pressure, means spaced from the source of supply for decreasing the volume of each of said pockets to a predetermined volume a member cooperable with said means for decreasing the volume of said pockets to apply a predetermined pressure to the plastic material in each of said pockets, and means to return excess material to the source of supply.

8. In apparatus for producing accurately measured masses of plastic material, means for overfilling each of a plurality of measuring pockets wtih plastic material from a source of supply under pressure, means for forcing all but a predetermined volume of plastic material from said pocket, means coacting with said last mentioned means to apply an increased predetermined pressure to the predetermined volume of plastic material in said pocket, and a passage to carry said excess plastic material to said source of supply.

9. In apparatus for producing measured plastic masses, a measuring pocket movable adjacent a source of supply of plastic material and a discharge station, a piston member mounted for sliding movement in said measuring pocket and actuated to withdraw at said source of supply to receive plastic material and to expel plastic at said discharge station, means to cause said piston to compress plastic material in said measuring pocket to a predetermined volume, a member coacting with said piston to apply a predetermined pressure to the plastic material in said pocket and means to return excess material to the source of supply.

10. In apparatus for producing measured masses of plastic material, a movable measuring cavity, a piston slidably mounted in said cavity, a source of supply of plastic material to fill said cavity as said cavity moves adjacent said source of supply, an opening adjacent the path of said cavity, a valve closing said opening and requiring a predetermined force to move, and means for actuating said piston to decrease the volume of said measuring cavity to a predetermined volume when said cavity is adjacent said opening.

11. Apparatus for producing measured masses of plastic material which comprises a plurality of rotary members, a plurality of measuring cavities in each of said members, pistons slidably mounted in each of said cavities, a stationary housing for said rotary members, an intake port through said housing and communicating with the measuring cavities of said members, a discharge station for each of said members opening through said housing, means for actuating said pistons at the intake port and discharge station to receive and expel plastic material from said cavities and to decrease the volume of said measuring cavity between said intake port and discharge station, and means acting in opposition to said pistons to apply a predetermined pressure to plastic material in said cavities between said intake port and discharge stations.

12. The method of producing measured plastic masses which comprises continuously flowing plastic material from a source of supply under pressure, alternately filling each of a plurality of measuring pockets arranged in a plurality of sequences, decreasing the size of said measuring pockets to a predetermined volume, applying a predetermined pressure to the plastic material in said pockets as the size of said measuring pockets is decreased to a predetermined volume, permitting escape from said pockets of any excess of plastic material over said predetermined volume at said predetermined pressure, alternately depositing formed masses of plastic from the measuring pockets of each of said sequences, and moving said sequences of measuring pockets in timed relation to cause continuous and substantially uniform flow of plastic material from said source of supply to said measuring pockets.

13. In apparatus for producing accurately measured masses of plastic material, means for filling measuring pockets with plastic material from a source of supply under pressure, a member spaced from the filling means to apply a predetermined pressure to the plastic material in said pockets, means to compress said plastic in said measuring pockets to a predetermined volume while said plastic material is in communication with said source of supply to permit separation of any excess of plastic material over said predetermined volume at said predetermined pressure.

14. Apparatus in accordance with claim 13, and having means for adjusting the predetermined pressure exerted by said member.

15. Apparatus for producing measured masses of plastic material which comprises a stationary housing, a pair of rotary members mounted in said housing, measuring cavities in each of said rotary members, piston members mounted for sliding movement in each of said cavities, an intake port in communication with the paths of said measuring cavities, a passage through said housing in communication with each of the paths of said measuring cavities and spaced from said intake port, a valve controlling each of said passages to permit removal of plastic material from said cavities, means urging said valves to close said passages with a predetermined force, and means for actuating said piston to fill each of said cavities at said intake port and to compress the plastic in said cavities to a predetermined volume when each of said cavities is adjacent one of said valves.

16. The method of continuously producing measured plastic masses which comprises continuously flowing plastic material from a source of supply under pressure, successively placing plastic material from said source of supply in one of a plurality of continuously moving molding cavities arranged in at least two sequences, sealing said molding cavities from said source of supply, successively decreasing the volume of said molding cavities to a predetermined volume, simultaneously applying a predetermined pressure to said molding cavities, separating any excess of plastic material over said predetermined volume at said predetermined pressure, sealing said molding cavities when they contain a predetermined volume of plastic material at a predetermined pressure, and successively depositing plastic material from said molding cavities directly into enwrapments.

17. The method of producing masses of plastic material which comprises measuring a mass of plastic material, compressing said mass to a predetermined volume of said material at a predetermined pressure, separating any excess of said material over said predetermined volume at said predetermined pressure, returning any such excess to the source of plastic material, and depositing said predetermined volume for packaging.

CLARENCE W. VOGT.

References Cited in the file of this patent

UNITED STATES PATENTS

| Number | Name | Date |
| --- | --- | --- |
| 353,095 | Thaison | Nov. 23, 1886 |
| 518,597 | Gilbert | Apr. 24, 1894 |
| 762,906 | Jenkins | June 21, 1904 |
| 783,960 | Jenkins | Feb. 28, 1905 |
| 2,325,687 | Kux | Aug. 3, 1943 |
| 2,375,955 | Smith | May 15, 1945 |
| 2,451,301 | O'Connell | Oct. 12, 1948 |